Patented Jan. 22, 1935

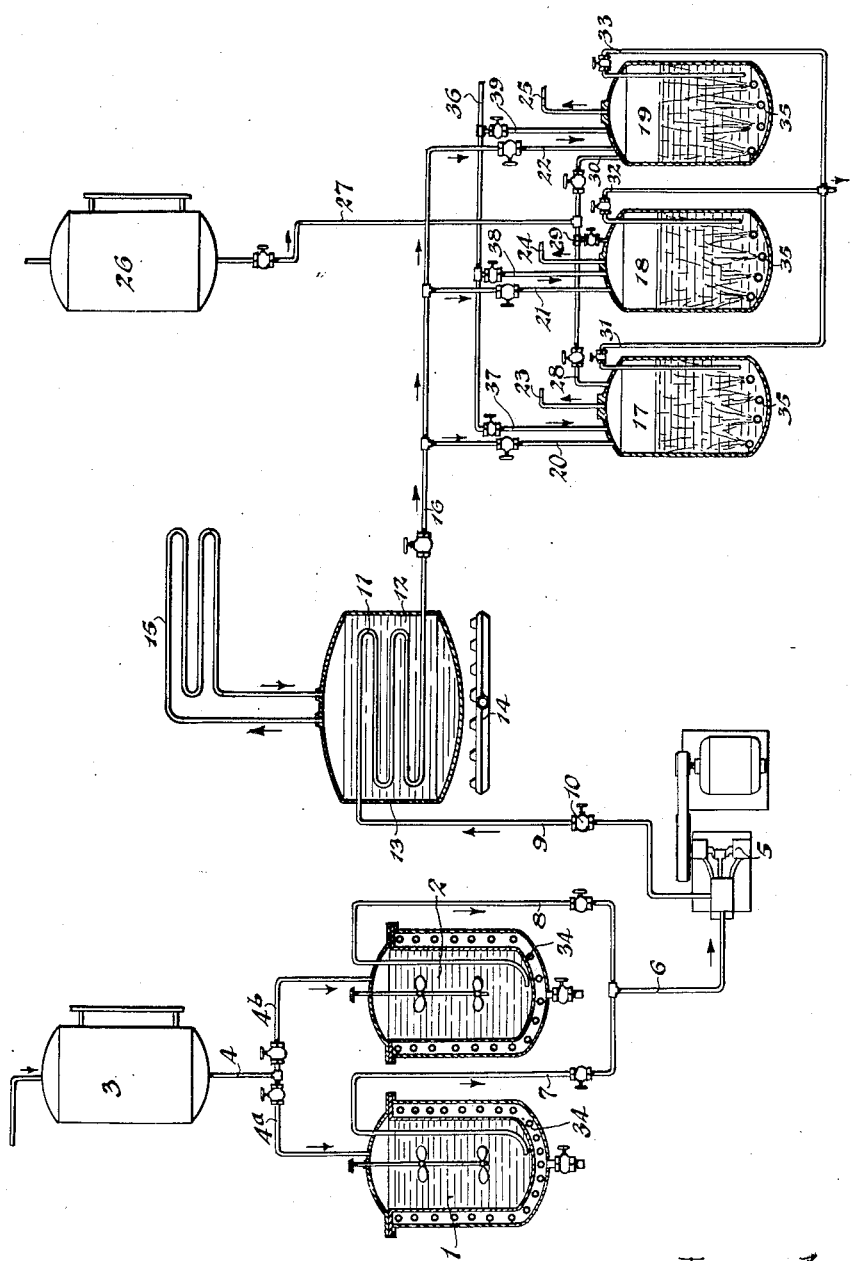

1,988,719

UNITED STATES PATENT OFFICE 1,988,719

PROCESS OF ARYLATING PERI ACID

William J. Cotton, Buffalo, N. Y., assignor to National Aniline & Chemical Company, Inc., New York, N. Y., a corporation of New York Application October 26, 1929, Serial No. 402,640

35 Claims. (260—129)

This invention relates to a process and an apparatus for arylating peri acid (1-aminonaphthalene-8-sulfonic acid), and, more particularly to correlated improvements and discoveries in the process of preparing a 1-arylaminonaphthalene-8-sulfonic acid (an aryl peri acid) from 1-aminonaphthalene-8-sulfonic acid (peri acid) and a primary aromatic amine.

Among the processes heretofore proposed for the arylation of peri acid, one process comprises heating 1 part of peri acid, 3.5 parts of aniline and 1 part of aniline hydrochloride under superatmospheric pressure in an autoclave for 10 hours at a temperature of 160°–170° C.; a second process comprises mixing aniline, peri acid and boiling water, adding sufficient hydrochloric acid to form a solution, and heating the solution under superatmospheric pressure in an autoclave for twenty hours at 140° C.; a third process comprises heating the sodium salt of peri acid with aniline (or toluidine) and an acid, usually a mineral acid, as a catalyst, under superatmospheric pressure in an autoclave; a fourth process comprises heating about 1 mol of peri acid with about 7—8 mols of aniline and about 6—7 mols of water under superatmospheric pressure in an autoclave; a fifth process comprises heating a mixture of 1 part of aniline oil (or toluidine) and 3 parts of pure peri acid under a high vacuum to remove all moisture, and then heating the mass at atmospheric pressure and a temperature of 160° C. for 24 hours; and a sixth process comprises heating a mixture of aniline oil and aniline hydrochloride at a temperature of about 120° C. for about 8 hours, to insure the removal of water, adding peri acid, and heating the mixture at a temperature of about 150° C. for about 24 hours.

In attempting to utilize the above processes for the commercial production of aryl-peri acids it is found that they are all costly and objectionable in various features. Those processes which are carried out under superatmospheric pressure require an autoclave; the processes which utilize an acid or an acid salt of the primary amine show a high apparatus maintenance cost, due to the corrosive action of the acid on the apparatus; the processes which remove all of the water prior to the condensation step give a product contaminated by tar, which decreases the purity of the final product and makes its isolation more difficult; and the processes which employ an alkali-metal salt of peri acid in the reaction result in a relatively low yield of aryl-peri acid.

An object of the invention is to provide a process for the production of aryl-peri acids of a high degree of purity and with a high yield.

Another object of the invention is to provide a process for carrying out the arylation of peri acid by means of a primary aromatic amine under optimum conditions of reaction temperature and reaction time for the obtainment of a maximum yield of aryl-peri acid.

An additional object of the invention is to provide a process and an apparatus for the preparation of aryl-peri acids, particularly phenyl-peri acid, in a continuous manner, whereby the production of aryl-peri acids may be occasioned with fewer manipulations, greater ease of control and yielding a product of greater uniformity.

Further objects of the invention are to conduct the arylation under atmospheric pressure rather than at a super-atmospheric pressure, thereby avoiding the employment of an autoclave; to conduct the arylation in the absence of an inorganic acid or amine salt thereof; and to minimize tar formation.

Other objects of the invention will in part be obvious and will in part appear hereinafter.

For a fuller understanding of the nature and objects of the invention reference should be had to the following detailed description taken in connection with the accompanying drawing in which there is shown diagrammatically an apparatus suitable for the continuous preparation of aryl-peri acids.

In the practice of the present invention the objects thereof are accomplished by causing a primary aromatic amine to condense with peri acid under controlled reaction conditions. After the reaction is completed, residual primary amine may be removed, as for example, by extraction or by vacuum or steam distillation, and the aryl-peri acid may be recovered, either as the free acid or as a salt, in any suitable manner.

The invention accordingly comprises the several steps and the relation of one or more of such steps with respect to the others thereof, and the apparatus embodying features of construction, combinations of elements and arrangement of parts which are adapted to effect such steps, all as exemplified in the following detailed disclosure. The scope of the invention will be indicated in the claims.

I have found that the yield obtainable from a given reaction mixture is a function of the temperature employed and of the duration of the period of heating. In reacting peri acid and a primary aromatic amine at a constant temperature, I have found, with an increase in the time of heating, that at first the yield increases until it reaches a maximum value and then it decreases; that is, the yield increases until a time is reached when further heating produces no further increase in yield and ultimately causes a lowering of the yield. Moreover, while this relation of yield to time of heating exists throughout the reactive temperature range, the time of heating necessary to produce a maximum yield of aryl-peri acid varies with the reaction temperature. In general, at the higher temperatures the time required to produce a maximum yield of aryl-peri acid is shorter than at lower temperatures.

Accordingly, in the practice of the present invention, the reaction mixture is preferably heated at a reaction temperature until the yield of peri-acid produced reaches a maximum value, and then the heating is discontinued.

The reaction may be carried out at temperatures above 130° C., particularly between about 135° C. and 185° C. Temperatures of about 145° C. to about 180° C. are preferred, however, for practical operation.

When aniline is employed as the primary aromatic amine, any given reaction mixture will produce substantially the same maximum yield of phenyl-peri acid at any of the temperatures within the range of about 145° C. to about 185° C. (i. e., the maxima will all be substantially the same for that reaction mixture), provided the duration of the period of heating at the particular temperature employed corresponds to the optimum time, i. e., the time period for maximum yield at that temperature. Thus, in the reaction of a mixture of substantially pure peri acid, aniline, and water in the proportions of 1 mol of peri acid to about 7 mols of aniline to about 0.5 mol of water, a maximum yield of about 95 to 98 or more per cent. of the theoretical yield of phenyl-peri acid is obtainable at a temperature within the range of about 150° to 170° C. by heating the reaction mixture at said temperature for approximately the period of time represented by the formula $T=173-t$, in which T is time in hours, and $t$ is temperature in degrees centrigrade. Substantially the same maximum yield can be obtained from a given reaction mixture by heating it at a temperature of about 150° C. for about 22 to about 26 hours, preferably 24 hours, as can be obtained at a reaction temperature of about 155° C. in about 17 to about 19, preferably 18, hours. A temperature of about 160° C. requires a period of heating of about 11 hours and 15 minutes to about 12 hours and 45 minutes, preferably 12 hours; a temperature of about 170° C. requires about 2 hours and 50 minutes to about 3 hours and 10 minutes, preferably 3 hours; and a temperature of about 180° C. requires about 20 minutes to produce substantially the same yield.

When p-toluidine is employed as the primary aromatic amine, any given reaction mixture will similarly produce a series of maximum yields of p-tolyl-peri acid (1-p-tolylamino-naphthalene-8-sulfonic acid), there being a maximum for each of the reaction temperatures within the above limits, depending upon the duration of the time of heating at that temperature. In the case of p-toluidine, however, for any given reaction mixture these maxima are not the same for each of said temperatures, but vary among themselves; and there is a single set of temperature and time conditions where the greatest yield is obtained for said given reaction mixture. Thus, with a particular reaction mixture of peri acid, p-toluidine, and water, the highest yield of p-tolyl-peri acid is obtained by heating the reaction mixture at about 155° C. for a period of about 24 hours, other temperatures and/or durations of time of heating of said reaction mixture failing to give as high a yield.

In addition, I have found, in order to obtain maximum yields, that peri acid employed, should be relatively free from organic impurities and should not contain more than a relatively small amount, if any, of soluble inorganic impurities, as for example, alkali-metal salts, and especially sodium chloride; inasmuch as the presence of an appreciable amount of an alkali-metal salt, particularly of sodium chloride, deleteriously affects the yield of aryl-peri acid resulting from the process. Accordingly, in the practice of the present invention, the peri acid preferably employed, when reduced to an ash with sulfuric acid, should not give an amount of water-soluble sulfated ash in excess of that equivalent to 0.5 per cent., and preferably 0.2 per cent., of sodium sulfate, based on the weight of the peri acid. For convenience, the per cent by weight of sodium sulfate equivalent to the weight of water soluble sulfated ash obtained when the peri acid is reduced to an ash with sulfuric acid, based upon the weight of the peri acid treated, will be referred to in the specification and claims as the "sodium sulfate value". Thus, by this definition, peri acid of such purity that, when reduced to an ash with sulfuric acid, the amount of water soluble sulfated ash is equivalent to 0.5 per cent of sodium sulfate, based on the weight of the peri acid, has a sodium sulfate value of 0.5.

I have found, furthermore, that the presence of water in the reaction mixture is desirable. If the reaction mixture does not contain water, a tar tends to form which interferes with the isolation of the product, darkens the product, and dulls the dyestuffs made therefrom; whereas, if the reaction mixture contains water, even in an amount substantially less than 6 mols per mol of the peri acid employed, an easily isolated, lighter-colored product is obtained yielding brighter dyestuffs. Moreover, I have found that it is not necessary, when the reaction mixture contains water, to carry out the reaction in an autoclave, but that the process may be operated at atmospheric pressure. Consequently, in the practice of the present invention, a reaction mixture is employed which contains water preferably in an amount substantially less than 6 mols per mol of the weight of the peri acid employed, and it is preferably heated at atmospheric pressure.

The amount of water employed in practical operation of the process is generally not less than about 0.5 mol, and may be as high as 6 mols or more, per mol of peri acid; preferably from about 0.5 to 2 mols of water per mol of peri acid are employed. The lesser amounts of water are usually employed with peri acids giving the smaller amounts of water-soluble sulfated ash on ashing with sulfuric acid; inasmuch as the presence of water, within the above limits, appears to have an effect upon the reaction tending to counteract the effect produced by the presence of an alkali-metal salt. Even with substantially pure peri acid, however, the presence of some water is desirable, since it reduces the tendency of the mixture to tar formation, as is evidenced by the lighter color of the product obtained when water is used. A minimum of about 0.5 mol of water per mol of peri acid is preferably employed in practice.

In carrying out the process of the invention the water may be retained in the reaction mixture in any suitable manner and any suitable pressure may be used; since it is only necessary for optimum results that the reacting ingredients of optimum composition and in optimum proportions be heated at the optimum temperature for the optimum period of time, all as above set forth. For ease of operation and low cost, a vessel equipped with a reflux condenser and operating under atmospheric pressure is preferred. But, if desired, the reaction also can be carried out in an open vessel, allowing the vapors of water and aryl amine given off to escape, and replacing them by suitable additions of water and aryl amine to the reaction mixture. Further, and particularly at the higher temperatures, the reaction can be carried out in a closed vessel under superatmospheric pressure, if desired.

The primary amine may be employed in excess, and in general an amount greater than about 5 mols per mol of peri acid is used. The preferred proportions are about 6.5 to about 7.5 mols of primary aromatic amine per mol of peri acid; a smaller amount decreasing the yield of aryl-peri acid and a larger amount being of no material advantage.

The arylation process may be conducted as an intermittent process, and also as a continuous process, particularly at the higher temperatures which require a relatively short reaction period, e. g., 160° to 185° C. When operating continuously, the reaction mixture containing the peri acid and primary aromatic amine (e. g., aniline) in suitable proportions (e. g., those given above) is passed through a reaction chamber, preferably at a constant rate of speed. The rate of passage of the reaction mixture through the reaction chamber is preferably adjusted so that the reaction mixture remains in the reaction chamber only for the time necessary to bring it to the desired reaction temperature (e. g., 183° C.) and to hold it there for the desired reaction period (e. g., 15 to 18 minutes). The mixture leaving the reaction chamber is treated in any suitable manner to recover the aryl-peri acid produced.

The reaction mixture may be previously prepared in the form of a solution, e. g., by mixing relatively large amounts of peri acid and primary aromatic amine, e. g., about 1 part by weight of peri acid to 3 parts by weight of amine, and preheating the mixture, preferably with agitation, to a temperature of about 130° C. By preheating the reaction mixture to a temperature of about 130° C., ease of control of the reaction temperature is facilitated and the reaction mixture is a substantially homogeneous solution before it is introduced into the reaction chamber, while little if any reaction takes place at this temperature. Several mixing vessels may be provided, so that while one is charging the reaction chamber the other or others can be used to prepare the reaction mixture.

The reaction chamber may be in the form of a tubular coil of sufficient length, and it may be maintained at the desired reaction temperature in any suitable manner, e. g., by a heating bath which may be a molten solid or a liquid. Liquids boiling at or near the desired reaction temperature (e. g., aniline) may be used for the heating bath. If desired, means may be included for regulating the pressure on said liquid, and/or a reflux condenser may be employed to condense and return liquid vaporized from the heating bath, thereby rendering the temperature control of the reaction chamber substantially automatic. The reaction mixture may be passed through the reaction chamber as by gravity, by a pressure or suction pump, etc.; and the rate of passage may be properly adjusted, e. g., by means of valves, and/or by adjusting the rate of pumping, when a pump is used.

The aryl-peri acid may be recovered from the reaction mixture, either as the free acid or its salts, in any suitable manner. Thus, a reaction mixture containing phenyl-peri acid and excess aniline may be discharged from the reactor into a still, preferably containing about 8 to 10 parts of water per part of peri acid treated. When about 4 parts of the reaction mixture have been added to the still, the flow may be diverted to another similar still, and the phenyl-peri acid may then be recovered from the first still by neutralizing the phenyl-peri acid with alkali, removing the excess aniline (e. g., by steam distillation), filtering to remove insoluble impurities, and salting out with sodium chloride the phenyl-peri acid in the form of its alkali-metal salt. By providing several mixing vessels and several stills, the flow of reaction mixture through the reaction chamber may be made constant and the process may be rendered continuous.

An apparatus suitable for practicing the continuous process in accordance with this invention is shown diagrammatically in the accompanying drawing. This apparatus consists of a plurality of jacketed solution kettles 1 and 2, which may preferably be enamel lined and equipped with agitators. The jackets of the kettles may preferably contain a heat transferring medium, as, for example, oil, heated by steam coils 34. A measuring tank 3 is provided which may be positioned above the solution kettles and is connected therewith through a pipe 4 having valved branch connections 4a and 4b, whereby the aromatic amine, for example, aniline, may be discharged into the solution kettles. A conveying means as a pump 5, preferably being fabricated from "Duriron", is connected with the solution kettles through a pipe 6 having valved branches 7 and 8 leading to the solution kettles 1 and 2, respectively. The conveying means is also provided with a pipe 9 having a valve 10 which connects the conveying means with the inlet of a reaction chamber consisting of a tubular reactor 11 contained within a heating bath 12 and enclosed in a jacket 13. The reactor is preferably constructed of aluminum. The heating bath may be maintained at the desired temperature by any suitable means, such as a gas burner 14, and a condenser, which may be a reflux condenser 15, is connected to the jacket 13 and provides a means for the condensation, and if desired, the return of the vapors given off from the heating bath. The tubular reactor 11 is connected with a valved pipe line 16 by means of which the reaction mixture is conducted to, and discharged through, valved pipe connections 20, 21 and 22, into one or more of a plurality or battery of stills 17, 18 and 19. The stills are heated in any desirable manner and are provided with open steam coils 35 for steam distillation purposes. Outlets consisting of valved pipe connections 23, 24 and 25 lead away the vapors arising within the stills. A measuring tank 26, which may be positioned above the stills, serves for the introduction thereinto of an alkaline solution, as a caustic soda solution, by means of a pipe 27 and valved branches thereof 28, 29 and 30. Connected with the stills are valved pipes 37, 38 and 39 which in turn connect with the pipe or conduit 36 through which water may be introduced into the stills, and valved outlet pipes 31, 32 and 33 provide for the removal of material from the stills.

By providing a plurality of solution kettles 1 and 2, each of which is connected by a suitable valved connection to the intake of the conveying means or pump 5, and by providing a plurality or battery of stills 17, 18 and 19, the process is readily rendered continuous; because, during the time that one of the solution kettles is being emptied, another may be utilized in the preparation of the solution for introduction to the reaction chamber, and during the time that the reaction mixture is being discharged from the tubular reactor into one of the stills, the aryl-peri acid may be recovered by treatment in another of the stills. It has been found preferable to have the tubular reactor and all pipes and connections fabricated from "Duriron" or aluminum, and also, in order to prevent solidification and stoppage, to have all pipe lines carrying molten material heated.

As illustrative embodiments of a manner in which the invention may be practiced the following examples are presented.

*Example 1.*—555 pounds of 1-aminonaphthalene-8-sulfonic acid, containing about 1 mol of water per mol of peri acid, either as moisture or as water of crystallization, and giving, when reduced to an ash with sulfuric acid, an amount of water-soluble sulfated ash equivalent to 0.2 per cent. of sodium sulfate (i. e., having a sodium sulfate value of 0.2), is agitated and heated under atmospheric pressure with about 1550 pounds of substantially anhydrous aniline (about 7 mols of aniline per mol of peri acid) in a jacketed kettle equipped with an agitator and a reflux condenser. The temperature of the mixture (that is, its boiling point) is allowed to rise to 160° C., the water which evaporates off (about 0.5 mol) being discarded. When the temperature reaches 160° C., which requires about 8 to 9 hours, the mixture is allowed to reflux at about that temperature (160° C.) for about 12 hours, the temperature of the reflux condenser being sufficiently low to condense all of the vapors given off, and the total condensate being returned to the reaction. At the completion of the heating operation, the reaction mixture is discharged into a still containing about 4,000 to 5,000 pounds of water, and it is made neutral with alkali (such as, sodium hydroxide) which is added in the form of an aqueous solution, thereby forming in solution the alkali-metal salt of the phenyl-peri acid (1-phenyl-amino-naphthalene-8-sulfonic acid) present. The resulting mass is subjected to steam distillation to remove residual aniline, which may be recovered and reused in the process, and is then filtered to remove any insoluble impurities that may be present. The alkali-metal salt of the phenyl-peri acid is then salted out from the remaining solution by the addition of common salt (NaCl), is filtered off, and washed with an aqueous solution of common salt. The resulting filter-cake can be directly employed for the preparation of dyestuffs in the usual manner.

It will be realized that the invention is not limited to the process and the details thereof which are set forth in the foregoing example. Thus, the reaction may be carried out with peri acid containing a greater proportion of impurities, but for superior results the purity of the peri acid employed should be such that its sodium sulfate value is not more than 0.5 and preferably not more than 0.2. The reaction mixture initially may contain considerable water, both in the free state and as water of crystallization, but for optimum results all water in excess of about 0.5 to 2 mols per mol of peri acid is permitted to pass off during the preliminary stage of the process when the reaction mixture is being brought to the reaction temperature. If the reaction mixture, at the beginning of the period of heating at the reaction temperature, should contain less than the desired amount of water, the required amount of water may be added. The aniline may be employed in proportions of about 5 to about 9 mols per mol of peri acid, but proportions of about 6.5 to about 7.5 mols of aniline per mol of peri acid are preferred. The reaction temperature employed may be from about 135° to about 185° C., temperatures of about 145° C. to about 180° C. being preferred; the time of heating at the reaction temperature, for maximum yields, being the corresponding optimum time, as above pointed out. Instead of isolating the aryl-peri acid from the reaction mixture in the manner above described, the aryl-peri acid may be recovered, either as such or as a salt, by other suitable methods.

The process is applicable to the preparation of other aryl-peri acids by the employment of other suitable primary aromatic amines, such as, primary aromatic amines of the benzene series (e. g., toluidines, xylidines, etc.), naphthylamines, etc., as illustrated by the following example:

*Example 2.*—540 pounds of peri acid (1-aminonaphthalene-8-sulfonic acid) containing about 1 mol of water, either as such or as water of crystallization, and giving, when ashed with sulfuric acid, a water soluble sulfated ash equivalent to 0.2 per cent. of sodium sulfate (i. e., having a sodium sulfate value of 0.2), is agitated and heated under atmospheric pressure with about 1500 pounds of distilled p-toluidine in a jacketed kettle equipped with a reflux condenser and an agitator. The temperature of the mixture is allowed to rise to 155° C., the water which evaporates off being discarded. When the temperature reaches 155° C., which requires about 7 to 9 hours, the temperature is maintained at about that point (155° C.) for about 24 hours, the total reflux from the condenser being returned to the reaction kettle. Other temperatures and times of heating may be used as above pointed out; but, for a maximum yield of tolyl-peri acid, heating at about 155° C. for about 24 hours is preferred. At the completion of the heating operation the product can be recovered in a suitable manner; for example, according to the method for recovering phenyl-peri acid described in Example 1.

*Example 3.*—In practicing the invention according to the continuous procedure, three parts by weight of aniline may be introduced (referring to the drawing) from the measuring tank 3 into one of the solution kettles, for example, kettle 1, and one part by weight of peri acid (1-amino-naphthalene-8-sulfonic acid) may be added thereto with agitation. The agitation is continued and the temperature is raised to about 130° C. and held at that point for about one hour to insure solution of the peri acid in the aniline. This solution is then conveyed by means of appropriate pipe connections and pump 5 to the reaction chamber and through the tubular reactor 11, which is maintained at a temperature of 183° C. by means of a heating bath consisting preferably of aniline which has a boiling point of about 183° C. The heating bath is held at a boiling temperature by heat supplied by the gas burner 14. The aniline which is vaporized from the heating bath may be condensed and returned to it by the reflux condenser 15. The rate of flow of the reaction materials through the tubular reactor, and the pressure in the reactor are preferably controlled by adjusting valve 10 and the valve in pipe line 16 so that a portion of the reaction materials, in passing through the reactor, is rapidly heated to the reaction temperature of about 183° C. and maintained at that point for a period of about 15 to 18 minutes while under the desired pressure. The reaction mixture is then discharged into a still, for example 17, which has previously been charged with from about 8 to 10 parts by weight of water from pipe 36. When about 4 parts by weight of the reaction mixture has been introduced into the still, the flow thereof is diverted to another still, for example, 18. Sodium hydroxide from the measuring tank 26 is then introduced into the still until the reaction mixture is rendered neutral, whereupon the excess of aniline contained in the reaction mixture may be removed by steam distillation, the vapors passing off through the outlet pipe 23. The phenyl-peri acid, which remains in the still in the form of a solution of its sodium salt, may then be recovered in any suitable manner as, for example, by filtering the reaction mass to remove insoluble impurities, and then salting out the sodium salt of the phenyl-peri acid by means of common salt.

The products obtained in accordance with the process of the invention are of an excellent grade of purity, and dyestuffs manufactured from them, e. g., Fast Wool Blue R (Colour Index No. 208) and Fast Wool Blue B (Colour Index No. 209), give dyeings of clear, bright shades.

The invention thus affords a means of securing a high yield of aryl-peri acid of a high degree of purity; it permits the reaction between peri acid and a primary aromatic amine to be conducted under optimum conditions for securing a maximum yield of aryl-peri acid, and at atmospheric pressure; it avoids the necessity of an acidic catalyst; it may be economically operated on a commercial scale; and makes possible the manufacture of aryl-peri acids in a continuous manner.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

I claim:

1. In the process of producing an aryl-peri acid by reacting peri acid with a primary aromatic amine in the absence of a salt of the amine with an inorganic acid, the improvement which comprises boiling at atmospheric pressure a reaction mixture containing peri acid, the primary aromatic amine and water in an amount not exceeding about 2 mols per mol of peri acid.

2. In the process of producing an aryl-peri acid by reacting peri acid with a primary aromatic amine in the absence of a salt of the amine with an inorganic acid, the improvement which comprises boiling at atmospheric pressure a reaction mixture containing peri acid and the primary aromatic amine in an amount in excess of that theoretically required while maintaining in said reaction mixture about 0.5 to about 2 mols of water per mol of peri acid originally present.

3. In the process of producing an aryl-peri acid by reacting peri acid with a primary aromatic amine in the absence of a salt of the amine with an inorganic acid, the improvement which comprises boiling under reflux conditions a reaction mixture containing 1 mol of peri acid, about 5 to about 9 mols of a primary aromatic amine of the benzene series and about 0.5 to about 2 mols of water.

4. In the process of producing an aryl-peri acid by reacting peri acid with a primary aromatic amine in the absence of a salt of the amine with an inorganic acid, the improvement which comprises heating at a temperature between about 145° and about 180° C. a reaction mixture containing 1 mol of peri acid and about 6.5 to about 7.5 mols of a primary aromatic amine of the benzene series while maintaining in the reaction mixture about 0.5 to about 2 mols per mol of peri acid originally present.

5. In the process of producing an aryl-peri acid by reacting peri acid with a primary aromatic amine in the absence of a salt of the amine with an inorganic acid, the improvement which comprises boiling at atmospheric pressure a reaction mixture containing 1 mol of peri acid and about 6.5 to about 7.5 mols of a primary aromatic amine of the benzene series, and maintaining in the reaction mixture about 0.5 to about 2 mols of water per mol of peri acid originally present.

6. In the process of producing an aryl-peri acid by reacting peri acid with a primary aromatic amine in the presence of water, the improvement which comprises carrying out the reaction with peri acid of such purity that its sodium sulfate value does not exceed 0.5.

7. In the process of producing an aryl-peri acid by reacting peri acid with a primary aromatic amine in the presence of water, the improvement which comprises carrying out the reaction with peri acid of such purity that its sodium sulfate value does not exceed 0.2.

8. In the process of producing an aryl-peri acid by reacting peri acid with a primary aromatic amine of the benzene series, the improvement which comprises carrying out the reaction with peri acid of such purity that its sodium sulfate value does not exceed 0.5, and maintaining in the reaction mixture about 0.5 to about 2 mols of water per mol of peri acid originally present.

9. In the process of producing an aryl-peri acid by reacting peri acid with a primary aromatic amine of the benzene series, the improvement which comprises heating peri acid, of such purity that its sodium sulfate value does not exceed 0.5, with a primary aromatic amine of the benzene series in the proportions of about 6.5 to about 7.5 mols per mol of peri acid, and maintaining in the reaction mixture at least 0.5 mol of water per mol of peri acid originally present.

10. In the process of producing an aryl-peri acid by heating peri acid with a primary aromatic amine in the absence of a salt of the amine with an inorganic acid, the improvement which comprises carrying out the process with a peri acid of such purity that its sodium sulfate value does not exceed 0.5 at a temperature above 130° C. until a maximum yield of aryl-peri acid is produced, and then discontinuing the heating.

11. In the process of producing an aryl-peri acid by heating peri acid with a primary aromatic amine in the absence of a salt of the amine with an inorganic acid, the improvement which comprises carrying out the process with a peri acid of such purity that its sodium sulfate value does not exceed 0.5 at a temperature between about 135° C. and about 185° C. until a maximum yield of aryl-peri acid is produced, and then discontinuing the heating.

12. In the process of producing an aryl-peri acid by heating peri acid with a primary aromatic amine in the absence of a salt of the amine with an inorganic acid, the improvement which comprises heating at atmospheric pressure a reaction mixture containing peri acid, a primary aromatic amine of the benzene series in an amount exceeding that theoretically required, and not more than about 2 mols of water per mol of peri acid at a temperature between 135° C. and about 185° C.

13. A process for the phenylation of peri acid which comprises heating peri acid of such purity that its sodium sulfate does not exceed 0.5 with aniline in an amount in excess of that theoretically required in the absence of an aniline salt of an inorganic acid, at a temperature of 150° to 170° C. for approximately a period of time represented by the formula $$T = 173 - t$$

wherein T is time in hours and $t$ is temperature in degree centigrade.

14. A process for the production of tolyl-peri acid which comprises heating peri acid of such purity that its sodium sulfate value does not exceed 0.5 with a toluidine in an amount in excess of that theoretically required, at a temperature of about 155° C. for about 24 hours in the absence of a toluidine salt of an inorganic acid.

15. In the process of producing an aryl-peri acid by heating peri acid with a primary aromatic amine in the absence of a salt of the amine with an inorganic acid, the improvement which comprises continuously passing a reaction mixture containing peri acid of such purity that its sodium sulfate value does not exceed 0.5 and the primary aromatic amine in an amount exceeding that theoretically required through a zone maintained at a reaction temperature above 135° C., and controlling the rate of passage of the reaction mixture through said zone so that it is held at said reaction temperature for a period of time corresponding with a maximum yield of aryl-peri acid.

16. A process for the phenylation of peri acid which comprises forming a solution of peri acid in aniline in the absence of a salt of the amine with an inorganic acid, at a temperature of about 130° C., the peri acid being of such purity that its sodium sulfate value does not exceed 0.5, continuously passing said solution through a zone maintained at a reaction temperature of about 170° to about 180° C., and controlling the rate of passage of the solution through said zone so that it is held at said reaction temperature for a period of time not exceeding 3 hours.

17. A process for the phenylation of peri acid which comprises forming a solution of peri acid in about 6.5 to about 7.5 mols of aniline and about 0.5 to about 2 mols of water per mol of peri acid at a temperature of about 130° C., the peri acid being of such purity that its sodium sulfate value does not exceed 0.5, continuously passing said solution through a zone maintained at a reaction temperature of about 170° to about 180° C., and controlling the rate of passage of the solution through said zone so that it is held at said reaction temperature for a period of time not exceeding 3 hours.

18. In the process of producing phenyl-peri acid by reacting peri acid with aniline, the improvement which comprises forming a solution of peri acid in aniline, continuously passing said solution through a zone maintained at a temperature of 180° to 183° C., and controlling the rate of passage of the solution through said zone so that it is held at said temperature for about 15 to about 20 minutes, the peri acid being of such purity that its sodium sulfate value does not exceed 0.5.

19. In the process of producing phenyl-peri acid by reacting peri acid with aniline, the improvement which comprises forming a solution of peri acid in at least 5 mols of aniline per mol of peri acid, continuously passing said solution through a zone maintained at a temperature of about 183° C. and controlling the rate of passage of the solution through said zone so that it is held at said temperature for about 15 to about 20 minutes, the peri acid being of such purity that its sodium sulfate value does not exceed 0.5.

20. In the process of producing an aryl-peri acid by reacting peri acid with a primary aromatic amine, the improvement which comprises boiling at a temperature above 130° C. and at atmospheric pressure a reaction mixture containing peri acid, the primary aromatic amine, and about 0.5 to about 2 mols of water per mol of peri acid originally present, and discontinuing the heating when a maximum yield of aryl-peri acid is produced, the peri acid employed being of such purity that its sodium sulfate value does not exceed 0.5.

21. In the process of producing an aryl-peri acid by heating peri acid with a primary aromatic amine, the improvement which comprises heating a reaction mixture containing peri acid, a primary aromatic amine of the benzene series in an amount exceeding that theoretically required, and at least 0.5 mol of water per mol of peri acid at a temperature between about 135° C. and about 185° C. until a maximum yield of aryl-peri acid is produced, and then discontinuing the heating, the peri acid being of such purity that its sodium sulfate value does not exceed 0.5.

22. In the process of producing an aryl-peri acid by reacting peri acid with a primary aromatic amine, the improvement which comprises boiling at a temperature between about 145° and about 180° C. and at atmospheric pressure a reaction mixture containing 1 mol of peri acid, about 5 to about 9 mols of a primary aromatic amine of the benzene series and about 0.5 to about 2 mols of water, and discontinuing the heating when a maximum yield of aryl-peri acid is produced, the peri acid employed being of such purity that its sodium sulfate value does not exceed 0.5.

23. A process for the arylation of peri acid which comprises heating at a temperature of about 135° C. to about 185° C., a reaction mixture containing peri acid, a primary aromatic amine of the benzene series in an amount exceeding that theoretically required, maintaining in the reaction mixture at least 0.5 mols of water per mol of peri acid originally present and discontinuing the heating when a maximum yield or aryl-peri acid has been produced, the peri acid being being of such purity that its sodium sulfate value does not exceed 0.5.

24. A process for the phenylation of peri acid which comprises heating aniline with peri acid in the proportion of about 7 mols of aniline per mol of peri acid, said peri acid being of such purity that its sodium sulfate value does not exceed about 0.2, and maintaining in the reaction mixture throughout the reaction period about 0.5 to about 2 mols of water per mol of peri acid originally present.

25. A process for the phenylation of peri acid, which comprises heating at a temperature of about 145° to 180° C. a mixture containing about 6.5 to about 7.5 mols of aniline and 1 mol of peri acid of such purity that its sodium sulfate value does not exceed about 0.2, maintaining in the reaction mixture about 0.5 to about 2 mols of water per mol of peri acid originally present, and discontinuing the heating when a maximum yield of phenyl peri acid has been produced.

26. A process for the phenylation of peri acid which comprises heating at a temperature of 150° to 170° C. and for approximately a period of time represented by the formula $$T = 173 - t$$

wherein T is time in hours and $t$ is temperature in degrees centigrade, a mixture containing 6.5 to 7.5 mols of aniline, about 1 mol of peri acid of such purity that its sodium sulfate value does not exceed about 0.5, and maintaining in the reaction mixture at least 0.5 mols of water per mol of peri acid originally present.

27. A process for the tolylation of peri acid, which comprises heating at a temperature of about 155° C. for about 24 hours a mixture containing about 6.5 to about 7.5 mols of p-toluidine and 1 mol of peri acid of such purity that its sodium sulfate value does not exceed 0.5, and maintaining in the reaction mixture about 0.5 to about 2 mols of water per mol of peri acid originally present.

28. An apparatus for the arylation of peri acid, comprising in combination, a vessel for forming a mixture of peri acid and a primary aromatic amine, means for supplying peri acid and said primary aromatic amine to said vessel, means for heating said vessel, a reaction chamber, means for continuously passing said mixture through said reaction chamber, and means for maintaining said reaction chamber at a reaction temperature.

29. An apparatus for the arylation of peri acid, comprising in combination, means for forming a solution of peri acid and a primary aromatic amine at an elevated temperature, a reaction chamber, means for continuously passing said solution through said reaction chamber, means for maintaining said reaction chamber at a reaction temperature, and means for controlling the rate of passage of said solution through said chamber.

30. An apparatus for the arylation of peri acid, comprising in combination, means for admixing and heating peri acid and a primary aromatic amine to form a solution, a reaction chamber, means for continuously passing said solution through said chamber, means for maintaining said solution at an elevated reaction temperature while passing through said chamber, and means for treating the resulting aryl-peri acid to separate it from other reaction components.

31. An apparatus for the arylation of peri acid, comprising in combination, a plurality of kettles, a heated reaction chamber, and means for selectively passing material from alternate kettles continuously through said reaction chamber.

32. An apparatus for the arylation of peri acid, comprising in combination, a heated kettle provided with an agitator for forming a solution of peri acid in aniline, a tubular reactor contained within a heating bath, a still adapted for steam distillation, and means for continuously passing said solution from said kettle, through said reactor, and into said still.

33. An apparatus for the arylation of peri acid, comprising in combination, a plurality of heated mixing kettles for forming a solution of peri acid in a primary aromatic amine, means for supplying peri acid and said primary aromatic amine to each of said kettles, a reaction chamber, heating means for maintaining said reaction chamber at a reaction temperature, a plurality of receiving vessels, and means for passing said solution from alternate kettles continuously through said reaction chamber and into alternate receiving vessels.

34. An apparatus for the arylation of peri acid, comprising in combination, a plurality of heated kettles each provided with an agitator for forming a solution of peri acid in aniline, means for supplying peri acid and aniline to each of said kettles, a tubular reactor, a heating bath for maintaining said reactor at a reaction temperature, means for selectively passing solution from one of said kettles through said reactor, means for controlling the rate of passage of said solution through said reactor, a battery of stills adapted for steam distillation, and means for selectively discharging reaction mixture from said reactor into one of said stills.

35. An apparatus for the arylation of peri acid, comprising in combination, a plurality of heated kettles each provided with an agitator for forming a body of solution of peri acid in aniline, means for supplying peri acid and aniline to each of said kettles, a tubular reactor, a heating jacket enclosing said reactor and adapted to contain a temperature controlling liquid, means for heating said liquid to its boiling point, a reflux condenser connected to said heating jacket for condensing and returning to said heating jacket vapors of said temperature controlling liquid, means for selectively passing solution from one of said kettles through said reactor, means for controlling the rate of passage of said solution through said reactor, a battery of stills, and means for selectively discharging reaction mixture from said reactor into one of said stills.

WILLIAM J. COTTON.